United States Patent
Wu et al.

(10) Patent No.: US 10,511,485 B2
(45) Date of Patent: Dec. 17, 2019

(54) DYNAMIC VIRTUAL NETWORK TOPOLOGY DISCOVERY ENGINE

(71) Applicant: AT&T Intellectual Property I, L.P., Atlanta, GA (US)

(72) Inventors: Tsong-Ho Wu, Englishtown, NJ (US); Wen-Jui Li, Bridgewater, NJ (US); Shyhyann Lee, East Brunswick, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 485 days.

(21) Appl. No.: 14/823,469

(22) Filed: Aug. 11, 2015

(65) Prior Publication Data
US 2017/0048110 A1 Feb. 16, 2017

(51) Int. Cl.
*H04L 29/08* (2006.01)
*H04L 12/24* (2006.01)
(Continued)

(52) U.S. Cl.
CPC .......... *H04L 41/12* (2013.01); *G06F 9/45533* (2013.01); *H04L 45/02* (2013.01); *H04L 41/0233* (2013.01)

(58) Field of Classification Search
CPC ..... H04L 49/70; H04L 45/02; H04L 41/0233; H04L 41/12; H04L 67/104; H04L 67/34; H04L 67/18
See application file for complete search history.

(56) References Cited

U.S. PATENT DOCUMENTS 7,275,096 B2 9/2007 Green
7,512,942 B2 3/2009 Brown et al.
(Continued)

FOREIGN PATENT DOCUMENTS

WO WO-2016089435 A1 * 6/2016 ............ H04L 12/42

OTHER PUBLICATIONS

Solomencevs, Arturs, "The Model Transformation for Getting a UML Class Diagram from a Topological Functioning Model," Applied Computer Systems 17.1, 2015, pp. 88-96.

*Primary Examiner* — Sargon N Nano
*Assistant Examiner* — Kidest Mendaye
(74) *Attorney, Agent, or Firm* — Hartman & Citrin LLC

(57) ABSTRACT

Concepts and technologies are disclosed herein for a real-time dynamic virtual network topology discovery engine to discover a dynamic network topology in virtualized networks in realtime. A processor that executes a network topology discovery engine can obtain network data that can describe elements of a data center and operational state of the elements. Obtaining network data can include obtaining network data from a network topology inventory database and through detecting operational state change events from virtual network components. The processor can construct a network topology model based upon the network data. The network topology model can include an object (representing an element of the data center) and an attribute representing a state of the element. The processor can update the network topology model in realtime. The network topology model and configurations can be stored for root cause analysis of fault events, resource orchestration in SDN networks, and other applications.

20 Claims, 9 Drawing Sheets

(51) Int. Cl.
*G06F 9/455* (2018.01)
*H04L 12/751* (2013.01)

(56) References Cited

U.S. PATENT DOCUMENTS

| | | | |
|---|---|---|---|
| 7,681,203 B2 | 3/2010 | Mandato et al. | |
| 8,635,605 B2 | 1/2014 | Chancey et al. | |
| 8,849,987 B2 | 9/2014 | Berg et al. | |
| 9,557,879 B1* | 1/2017 | Wang | G06F 3/0481 |
| 9,760,428 B1* | 9/2017 | Felstaine | H04L 41/022 |
| 9,860,314 B2* | 1/2018 | Kore | H04L 67/28 |
| 9,973,405 B2* | 5/2018 | Popokh | H04L 43/0817 |
| 2003/0097579 A1* | 5/2003 | England | G06F 21/53 |
| | | | 713/193 |
| 2005/0076054 A1* | 4/2005 | Moon | G05D 1/0088 |
| 2010/0030893 A1* | 2/2010 | Berg | G06F 9/5061 |
| | | | 709/224 |
| 2010/0262559 A1* | 10/2010 | Wilcock | G06Q 10/00 |
| | | | 705/348 |
| 2011/0004457 A1* | 1/2011 | Haviv | G06F 8/61 |
| | | | 703/21 |
| 2011/0029673 A1* | 2/2011 | Jaisinghani | H04L 41/12 |
| | | | 709/226 |
| 2011/0170448 A1* | 7/2011 | Buob | H04L 45/02 |
| | | | 370/252 |
| 2012/0197654 A1 | 8/2012 | Byrne et al. | |
| 2013/0055247 A1* | 2/2013 | Hiltgen | G06F 8/60 |
| | | | 718/1 |
| 2013/0091258 A1 | 4/2013 | Shaffer et al. | |
| 2014/0222745 A1* | 8/2014 | Deng | G06N 7/005 |
| | | | 706/47 |
| 2014/0310243 A1* | 10/2014 | McGee | G06F 17/30575 |
| | | | 707/639 |
| 2014/0310388 A1* | 10/2014 | Djukic | H04L 41/0816 |
| | | | 709/221 |
| 2014/0317261 A1* | 10/2014 | Shatzkamer | G06F 9/455 |
| | | | 709/223 |
| 2014/0317273 A1* | 10/2014 | Kruglick | H04L 43/04 |
| | | | 709/224 |
| 2014/0325038 A1* | 10/2014 | Kis | H04L 41/0803 |
| | | | 709/220 |
| 2015/0057821 A1* | 2/2015 | Nasle | G06Q 10/04 |
| | | | 700/291 |
| 2015/0082308 A1* | 3/2015 | Kiess | G06F 9/5072 |
| | | | 718/1 |
| 2015/0200838 A1 | 7/2015 | Nadeau et al. | |
| 2015/0200859 A1* | 7/2015 | Li | H04L 41/0823 |
| | | | 370/235 |
| 2015/0350102 A1* | 12/2015 | Leon-Garcia | H04L 41/12 |
| | | | 709/226 |
| 2016/0188609 A1* | 6/2016 | Strassner | G06F 17/3071 |
| | | | 707/740 |
| 2017/0004007 A1* | 1/2017 | Kousaka | G06F 8/36 |
| 2017/0244607 A1* | 8/2017 | Dujodwala | H04L 12/42 |
| 2017/0373931 A1* | 12/2017 | Liu | H04L 29/02 |

* cited by examiner

DYNAMIC VIRTUAL NETWORK TOPOLOGY DISCOVERY ENGINE

BACKGROUND

Cloud computing is an approach that can be used to allow customers to create and activate new services, as well as to update existing service capabilities on-demand and in near realtime. To accommodate requirements of on-demand service requests from customers, software defined networking ("SDN") is used to allow network infrastructure as a network resource pool (network-on-demand) to adapt to user service demand through on-demand network resource allocation and reallocation via hardware programmability on virtualized network components. Thus, SDN can obviate the need for demand to be adapted to constraints of hardware-oriented network infrastructure.

One difficulty in network operations arises, however, in SDN networks. The operation of on-demand network resource allocation and/or reallocation requires knowledge of the network topology at the time needed. A network topology is a set of network resource components and their relationships supporting given applications. Because SDN can enable almost instantaneous changes to the virtual network configuration, however, one may have difficulty tracking and discovering the connectivity relationship between virtualized network functions ("VNFs"), virtual machines ("VMs") and host hardware server at the time needed. As such, identifying available and utilized elements and/or information relating to the virtual network topology at a given time may be difficult, if not impossible.

SUMMARY

The present disclosure is directed to providing a dynamic virtual network topology discovery engine to construct a network topology model and discover the real-time topology update in virtualized networks. A dynamic virtual network topology discovery engine can be executed or hosted by a computing device such as a server computer. The virtual network topology discovery engine can be invoked at any time to create and store a virtual network topology discovery model. The virtual network topology discovery engine also can track the update of the virtual network topology at any time. The network topology model can describe a network and/or one or more components thereof including locations, operation states, capacities, associated hierarchies, and/or other relationships between the components. According to various embodiments, the network topology model can be formatted in a desired modeling format. In some embodiments, an object-oriented modeling language can be used to represent the network, its components, and relationships and hierarchies between the components of the network to support given virtualized network applications, and various attributes and/or inherited properties and/or attributes can provide additional information about the operation state of the network and/or its components.

A resource monitor can be configured to capture information of operation state and resource usage associated with a virtualized network and/or components thereof (e.g., data centers and the like). The network topology discovery engine can receive network data from the resource monitor. The network data can include, but is not limited to, cluster data that describes one or more servers associated with a data center; host data that describes one server associated with the server cluster in the data center that hosts virtualized network functions, virtual machines, and blades; virtual machine data that describes operational state and resource usage of one or more virtual machines associated with the host server in the data center that host virtualized network functions; blade data that describes operations state and resource usage of one or more blades associated with the host server in the data center that host application virtual machines; virtualized network function ("VNF") data that describes one or more virtualized network functions hosted by virtual machines located in the server cluster in the data center; software defined network ("SDN") controller data that describes operational state and resource usage of one or more SDN controllers (and/or nodes thereof) of the data center; hypervisor data that describes one or more hypervisors associated with the server host in the data center; capacity data that describes one or more capacities and their usage of one or more components of the data center; other data; combinations thereof; or the like. The network data also can include location information that can describe one or more geographic locations associated with the various components of the data center.

The network topology discovery engine can analyze the network data and generate the network topology model based upon the network data. The network topology discovery engine also can store the network topology model at a data storage device such as the data store. The network topology discovery engine also can update the network topology model at any time in response to detecting an operation state change of one or more application virtual machines at the network, in response to determining that a time period has passed (e.g., expiration of a timer job), and/or in response to other determinations. In some embodiments, the network topology model can be updated by the network topology discovery engine via correlation of operation state change events from network components upon detecting any operation state change being made to the network. In some embodiments, the changes can be detected in realtime. Thus, it can be appreciated that the network topology discovery engine can provide a realtime (or near-realtime) representation of the configuration of the network and/or components thereof (e.g., the data centers and/or components of the data centers) by way of updating the network topology model in realtime (or near-realtime).

The network topology discovery model can be used for various purposes. In some embodiments, in addition to the network topology discovery model providing a realtime (or near-realtime) representation of the configuration of the network and/or components thereof, the network topology discovery model can be used to map new service requests and/or existing service upgrade requests to the network resource allocation based upon realtime availability and/or utilization, to determine root causes for detected fault events, for other purposes, combinations thereof, or the like. In some embodiments, a fault correlation engine can be provided as a standalone device, while in some other embodiments, the network topology discovery engine can perform the root cause analysis of fault events.

According to one aspect of the concepts and technologies disclosed herein, a method is disclosed. The method can include obtaining, at a processor that executes a network topology discovery engine, network data. The network data can describe elements of a data center and the operation state information that relates to the elements. The processor can construct a virtual network topology discovery model based upon the network data. The virtual network topology model can include an object-oriented model of the data center, where the object-oriented model can include an object that corresponds to one of the elements of the data center, and the object can include an attribute that corresponds to an operation state of the one of the elements. The processor also can store the network topology model.

In some embodiments, the method also can include determining if the network topology model is to be updated and how to update, and in response to a determination that the network topology model is to be updated, updating the network topology model, and storing an updated version of the network topology model. In some embodiments, determining if the network topology model is to be updated can include determining if an update to the network data has been received. In some embodiments, determining if the network topology model is to be updated can include determining that the operational state of virtual network components (e.g., virtual machines and host blades) has been changed and/or a timer job has expired. The update of network topology model can be through applying operation state change event correlation to update the operation association between the virtualized network function, virtual machine, and blade, which forms a virtualized network topology, in the network topology discovery model In some embodiments, constructing the network topology discovery model can include constructing the network topology model in unified modeling language The attribute can be represented in the network topology model as the combination of the composition relationship (like parent-child relationship), the aggregation relationship (like uncle-nephew relationship), and the peer-to-peer relationship (i.e., two independent objects). The attribute can include an operational state of the one of the elements. The attribute can also include a geographic location of the one of the elements.

In some embodiments, constructing the network topology model can include selecting a server host and a virtualized network function associated with the data center; identifying virtual components associated with the server host; determining operational states of the components; determining locations of the components; determining available capacities of the components; and constructing, in unified modeling language, the network topology model. Each of the components can be represented by managed objects that can be monitored through a real-time event monitoring system including the object, and the operational states of the components, the locations of the components, and the available capacities of the components can be represented by relationships in the unified modeling language. The components can include virtualized network functions, virtual machines, and blades in a server host.

According to another aspect of the concepts and technologies disclosed herein, a system is disclosed. The system can include a processor and a memory. The memory can store computer-executable instructions that, when executed by the processor, cause the processor to perform operations including obtaining network data that describes elements of a data center and information that relates to the elements, constructing a network topology model based on the network data, and storing the network topology model. The network topology model can include an object-oriented model of the data center. The object-oriented model can include an object that corresponds to one of the elements of the data center. The object can include an attribute that corresponds to an operational state of the one of the elements.

In some embodiments, the computer-executable instructions, when executed by the processor, cause the processor to perform operations further including determining if the network topology model is to be updated and applying operational state change event correlation to perform the network topology model update in response to a determination that the network topology model is to be updated, updating the network topology model, and storing an updated version of the network topology model. In some embodiments, constructing the network topology model can include constructing the network topology model in unified modeling language. In some embodiments, the attribute can be represented as one or more relationships selected from a group of relationships including a composition relationship (like parent-child relationship), an aggregation relationship (like uncle-nephew relationship), and a peer-to-peer relationship (two entities are independent). In some embodiments, the attribute further can include a geographic location associated with the one of the elements and a capacity associated with the one of the elements.

According to yet another aspect, a computer storage medium is disclosed. The computer storage medium can have computer-executable instructions stored thereon that, when executed by a processor, cause the processor to perform operations. The operations can include obtaining network data that describes elements of a data center and information that relates to the elements; constructing a network topology model based on the network data; and storing the network topology model. The network topology model can include an object-oriented model of the data center. The object-oriented model can include an object that corresponds to one of the elements of the data center. The object can include an attribute that corresponds to an operational state of the one of the elements.

In some embodiments, the computer-executable instructions, when executed by the processor, can cause the processor to perform operations further including determining if the network topology model is to be updated and applying operational state change event correlation to perform the network topology model update in response to a determination that the network topology model is to be updated, updating the network topology model, and storing an updated version of the network topology model. In some embodiments, constructing the network topology model can include constructing the network topology model in unified modeling language. In some embodiments, the attribute can be represented as one or more relationships selected from a group of relationships including the composition relationship, the aggregation relationship, and the peer-to-peer relationship. In some embodiments, the attribute further can include a geographic location associated with the one of the elements and a capacity associated with the one of the elements.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
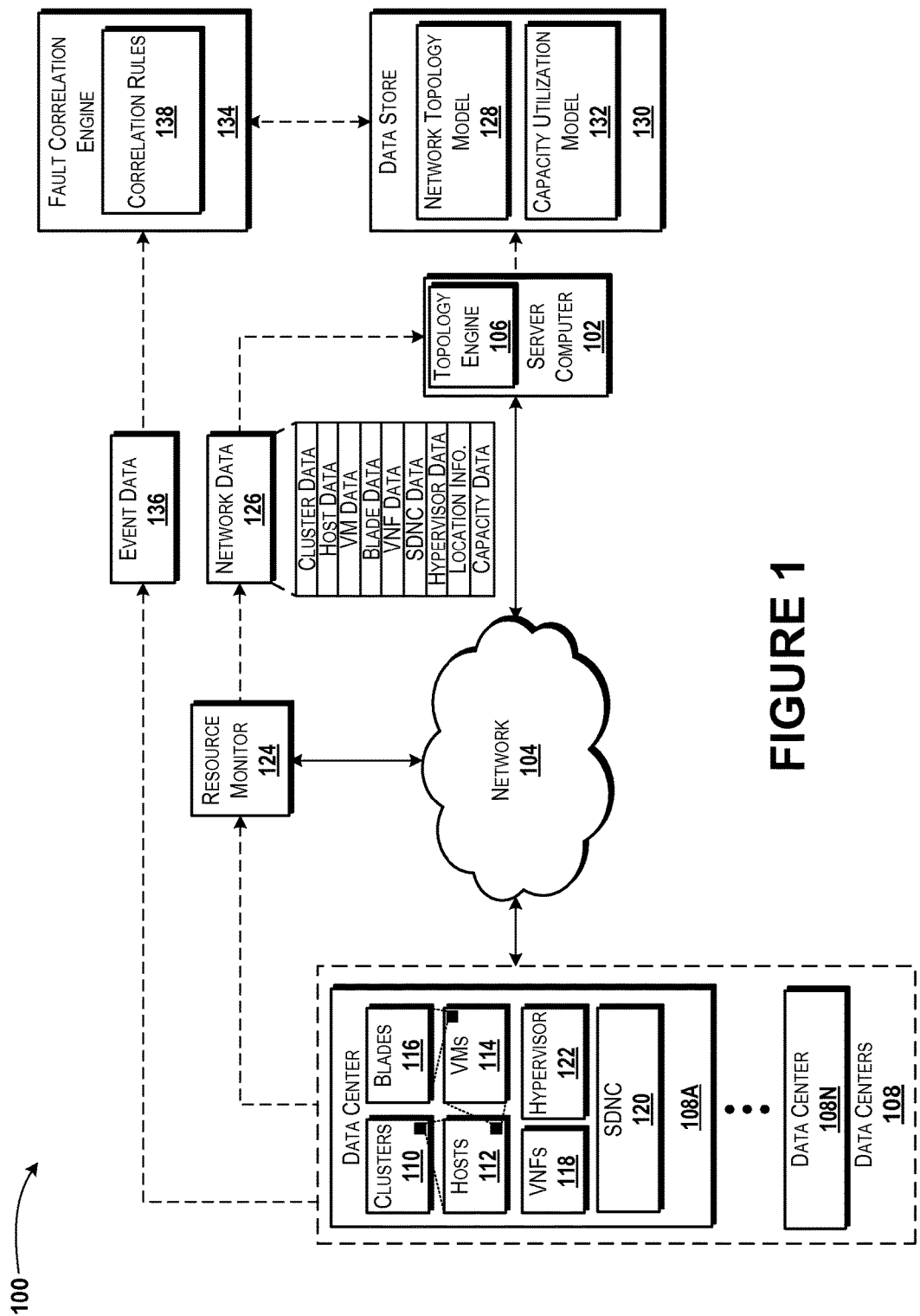
FIG. 1 is a system diagram illustrating an illustrative operating environment for various embodiments of the concepts and technologies described herein.

The following detailed description is directed to providing a network topology discovery engine to construct a network topology model and discover real-time topology update in virtualized networks. The network topology discovery engine can be executed or hosted by a computing device such as a server computer. The network topology discovery engine can create, store, and/or update a network topology model. The network topology model can describe a network and/or one or more components thereof including locations, capacities, associated hierarchies, and/or other relationships between the components to support given virtualized network functions, and various attributes and/or inherited properties and/or attributes can provide additional information about the operational state of the network and/or its components. According to various embodiments, the network topology model can be formatted in a desired modeling format. In some embodiments, an object-oriented modeling language can be used to represent the network, its components, and relationships and hierarchies between the components of the network.

A resource monitor can be configured to capture information of the operational state and resource usage associated with a network and/or components thereof (e.g., data centers and the like). The network topology discovery engine can receive network data from the resource monitor. The network data can describe various components of the data center including, but not limited to, the server cluster, server hosts, virtual machines, blades, virtualized network functions, SDN controllers, hypervisors, virtualized network functions and/or other service applications, as well as hardware components such as network interfaces, ports, and the like. The network data also can describe, for each of the components, associated operational states and capacities, locations, and/or other information.

The network topology discovery engine can analyze the network data and generate the network topology model based upon the network data. The network topology discovery engine also can store the network topology model at a data storage device such as a data store. The network topology discovery engine can update the network topology model at any time in response to various triggers such as detecting an operational state change event at the network components, determining that a time period (e.g., a preset time period) for topology update has passed, upon receiving a request to update the network topology model, combinations thereof, or the like. Thus, the network topology discovery engine can provide a representation of the network and/or components thereof that can be updated at any time.

The network topology model can be used for various purposes. For example, the network topology model can provide a realtime or near-realtime representation of the configuration of the network and/or its components. The network topology model also can be used to map new service requests and/or existing service upgrade requests to the network resource allocation based upon availability and/or utilization of the components. Also, the network topology model can be used to determine root causes for detected fault events, for other purposes, combinations thereof, or the like. In some embodiments, a fault correlation engine can be provided to analyze events and determine root causes based upon the fault event data, the network topology model and additional information such as correlation rules for operational state change events. The fault correlation engine can be provided as a standalone device or as a component of the network topology discovery engine.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for a network topology discovery engine will be described, according to an illustrative embodiment. The operating environment 100 shown in FIG. 1 includes a server computer system 102 (labeled "server computer 102" in FIG. 1). The server computer system 102 can operate in communication with and/or as part of a data center and/or a communications network ("network") 104.

According to various embodiments, the functionality of the server computer system 102 may be provided by one or more server computers or other computing devices such as, for example, desktop computers, mobile telephones, laptop computers, other computing devices or systems, combinations thereof, or the like. It should be understood that the functionality of the server computer system 102 can be provided by a single device, by two similar devices, and/or by two or more dissimilar devices. For purposes of describing the concepts and technologies disclosed herein, the server computer system 102 is described herein as a web server, application server, or other form of server computer. Based on the above, it should be understood that this embodiment is illustrative, and should not be construed as being limiting in any way.

The server computer system 102 can execute an operating system (not shown in FIG. 1) and one or more application programs such as, for example, a network topology discovery engine 106 (labeled "topology engine 106" in FIG. 1). The operating system can include a computer program for controlling the operation of the server computer system 102. The network topology discovery engine 106 can include an executable program configured to execute on top of the operating system to provide various functions as illustrated and described herein. The functionality of the network topology discovery engine 106 will be illustrated and described in more detail below, after explaining other elements of the example operating environment 100 shown in FIG. 1.

The operating environment 100 also can include various computing, storage, transport, and/or other resources. In FIG. 1, these resources are represented by one or more data centers 108A-N (hereinafter collectively and/or generically referred to as "data centers 108"). The data centers 108 also can be referred to herein as part of an "operations network." The operations network can be a part of or independent of the network 104, and as such the terms "operations network" and "network 104" should not be construed as necessarily being equivalent to one another.

One or more of the data centers 108 can include various types of resources for providing data processing, data storage, computing, network transport, combinations thereof, or the like. As shown in FIG. 1, an example data center 108A can include one or more servers as a server cluster 110 (labeled as "clusters 110" in FIG. 1), which can be provisioned in the data center 108. It should be understood that this example is illustrative and therefore should not be construed as being limiting in any way.

The server cluster 110 can include one or more server computers in the data center 108. The server computers can include one or more data storage devices (e.g., a memory, a hard drive, or the like) and a data or signal processing unit such as a processor or similar device as illustrated and described herein. The server cluster 110 can therefore be described as including one or more server hosts 112. The server host 112 is a server that can host and/or execute one or more virtual machines 114 (labeled as "VMs" in FIG. 1). The virtual machines 114 can be hosted by one or more blades 116 in the server host 112. It should be understood that this example is illustrative and therefore should not be construed as being limiting in any way.

The data centers 108 also can host and/or execute one or more virtualized network functions 118. Thus, as generally is understood, the virtualized network functions 118 can cooperate to provide an application or service (or application or service component), which can be hosted in whole or in part by virtual machines 114, which can be hosted by one or more blades 116, which can be hosted in whole or in part by one server host 112, which can be hosted in whole or in part by one server cluster 110, which can be hosted in whole or in part by one data center 108. Because the architecture and/or functions of a data center 108 are generally understood, the architecture and/or functions of these components will not be further elaborated upon in the description of FIG. 1.

The data centers 108 also can include one or more software defined network controllers 120 (labeled "SDNC" in FIG. 1). The SDN controllers 120 can manage and/or control connections, virtualized network functions 118, and/or the server hosts 112 and components thereof. The server host 112 also can include one or more hypervisors 122, which can perform resource management of virtual machines 114 and blades 116 in a server host 112. Although not visible in FIG. 1, the data centers 108 also can include virtual switches (also referred to as "vSwitches") and various hardware resources such as networking interfaces and the like. It should be understood that these examples of additional functionality are illustrative and therefore should not be construed as being limiting in any way.

The operating environment 100 also can include a network and/or resource monitor ("resource monitor") 124. The resource monitor 124 can be configured to detect and/or monitor aspects of the data centers 108 and/or the components thereof (e.g., the server clusters 110, the server hosts 112, the virtual machines 114, the blades 116, the virtualized network functions 118, the SDN controllers 120, the hypervisors 122, network transport and/or connections between the components, combinations thereof, or the like). The resource monitor 124 can capture information (e.g., operational state information, location information, powered on/off information, online/offline information, capacity information, combinations thereof, or the like) associated with the components of the data center 108 at various times (e.g., upon expiration of timer jobs), upon detecting triggers (e.g., hardware and/or software changes such as updates, upgrades, activation, or deactivation; requests; or the like), and/or at other times. According to various embodiments, the resource monitor 124 can capture the information associated with the data centers 108 and generate network data 126 that describes and/or captures this information. As shown in FIG. 1, the network data 126 can include cluster data, host data, virtual machine data, blade data, virtualized network function data, SDN controller data, hypervisor data, capacity data, location information, and the like.

The cluster data can include information or other types of data that can identify one or more server clusters 110, which can be provisioned in the data center 108. Thus, the network data 126 can include information that identifies one or more server clusters 110 and various relationships associated with those server clusters 110 such as, for example, what data centers 108 the server clusters 110 are located at; geographic locations associated with the server clusters 110; what server host 112, virtual machines 114, and/or virtualized network functions 118 are located at and/or associated with the server cluster 110; operational state information associated with the server clusters 110 (e.g., whether the server cluster 110 is active, inactive, etc.); combinations thereof; or the like. Because the cluster data can include additional and/or alternative types of information and/or can describe additional and/or alternative aspects of the server clusters 110 and/or relationships among components of the server clusters 110, it should be understood that these examples are illustrative and therefore should not be construed as being limiting in any way.

The host data can include information or other types of data that can identify one or more server hosts 112 in the server cluster 110. Thus, the network data 126 can include information that identifies one or more server hosts 112, which as shown in FIG. 1 can be associated with and/or included in the server cluster 110. The host data included in the network data 126 also can reflect or describe various relationships associated with one server host 112 hosted in the server cluster 110. Thus, for example, the host data can describe what host server cluster 110 and/or data center 108 the server host 112 is located at and/or associated with one or more server hosts 112; what geographic locations are associated with the server host 112; operational state information associated with the server host 112 (e.g., whether the server host 112 is active, inactive, provisioned, not provisioned, etc.); what virtual machines 114, blades 116, and virtualized network functions 118 are hosted by the server hosts 112; combinations thereof; or the like. Because the host data can describe additional and/or alternative aspects of the server hosts 112 and/or their relationships, it should be understood that these examples of the host data are illustrative and therefore should not be construed as being limiting in any way.

The virtual machine data can include information or other types of data that can identify one or more virtual machines 114. Thus, the network data 126 can include information that identifies one or more virtual machines 114, which as shown in FIG. 1 can be associated with and/or included in a server host 112 located in the server cluster 110. The virtual machine data included in the network data 126 also can reflect or describe various relationships associated with the one or more virtual machines 114 and/or between the virtual machines 114 and other components of the data centers 108. Thus, for example, the virtual machine data can describe what server hosts 112, server clusters 110, and/or data centers 108 the virtual machines 114 are located at and/or associated with one or more virtual machines 114; what geographic locations are associated with the virtual machines 114; operational state information associated with the virtual machines 114 (e.g., whether the virtual machines 114 are active, inactive, provisioned, not provisioned, operating at capacity or under capacity, etc.); what virtualized network functions 118 are hosted by the virtual machines 114; combinations thereof; or the like. Because the virtual machine data can describe additional and/or alternative aspects of the virtual machines 114 and/or their relationships, it should be understood that these examples of the host data are illustrative and therefore should not be construed as being limiting in any way.

The blade data can include can include information or other types of data that can identify one or more blades 116 associated with one or more virtual machines 114. Thus, the network data 126 can include information that identifies one or more blades 116, which as shown in FIG. 1 can be associated with and/or included in the one server host 112 in a server cluster 110 host, and/or one or more virtual machines 114. The blade data included in the network data 126 also can reflect or describe various relationships associated with the one or more blades 116 and other components of the data centers 108. Thus, for example, the blade data can describe what virtual machines 114, server hosts 112, server clusters 110, and/or data centers 108 the blades 116 are located at and/or associated with one or more blades 116; what geographic locations are associated with the blades 116; state information associated with the blades 116; what resources are available at the blades 116; combinations thereof; or the like. Because the blade data can describe additional and/or alternative aspects of the blades 116 and/or their relationships, it should be understood that these examples of the host data are illustrative and therefore should not be construed as being limiting in any way.

The virtualized network function data can include information or other types of data that can identify one or more virtualized network functions 118. Thus, the network data 126 can include information that identifies one or more virtualized network functions 118, which as shown in FIG. 1 can be associated with various components of the data centers 108. The virtualized network function data included in the network data 126 also can reflect or describe various relationships associated with the one or more virtualized network functions 118 and/or between the virtualized network functions 118 and other components of the data centers 108. Thus, for example, the virtualized network function data can describe what applications and/or services are associated with the virtualized network functions 118; where the virtualized network functions 118 are located; what geographic locations are associated with the virtualized network functions 118; state information associated with the virtualized network functions 118 (e.g., whether the virtualized network functions 118 are active, inactive, provisioned, not provisioned, instantiated, not instantiated, associated with another virtualized network function 118, capacity information, etc.); combinations thereof; or the like. Because the virtualized network function data can describe additional and/or alternative aspects of the virtualized network functions 118 and/or their relationships, it should be understood that these examples of the host data are illustrative and therefore should not be construed as being limiting in any way.

The SDN controller data can describe one or more SDN controllers 120 associated with a data center 108. Thus, the SDN controller data can identify an SDN controller 120 in a data center node and/or a central office node, locations associated with the SDN controller 120, resource components controlled by the SDN controller 120 and/or its nodes, combinations thereof, or the like. The hypervisor data can identify one or more hypervisors 122 associated with a server host 112 in the server cluster 110 located in the data center 108 and/or capacities, locations, and/or other information associated with the hypervisors 122. It should be understood that these examples are illustrative and therefore should not be construed as being limiting in any way.

The location information (labeled "location info." in FIG. 1) can describe geographic locations associated with one or more of the elements of the data center 108 and/or components thereof. Thus, the location information can describe geographic locations of the data centers 108, the server clusters 110, the server hosts 112, the virtual machines 114, the blades 116, the virtualized network functions 118, the SDN controller(s) 120 and/or nodes thereof, the hypervisor(s) 122, and/or other components of the data centers 108.

The capacity data can identify capacities associated with any elements of the data centers 108 and/or the components thereof. Thus, the network data 126 can identify; for one, more than one, and/or each of the hypervisors 122, the SDN controllers 120, the virtualized network functions 118, the blades 116, the virtual machines 114, the server hosts 112, the server clusters 110, and/or the data centers 108; an available, used, and/or total capacity. Thus, for example, the network data 126 can indicate that a particular virtualized network function 118 is operating under its total capacity, and/or that an associated blade 116, virtual machine 114, server host 112, and server cluster 110 is operating at a particular capacity. Clearly, this is merely an example as the capacity data can indicate any capacity information associated with any component of the data centers 108. Thus, this example should not be construed as being limiting in any way.

The network topology discovery engine 106 can be configured to receive or otherwise obtain the network data 126 from a network topology inventory database initially, which can be retrieved at a time such as one, more than one, and/or every preset time frame (e.g., every one hour, every ten seconds, or the like), and/or from the resource monitor 124 for network topology data updates. According to various embodiments of the concepts and technologies described herein, the network data 126 can be provided to the network topology discovery engine 106 by the network topology inventory database initially and the resource monitor 124 after that, requested by the network topology discovery engine 106 from the resource monitor 124 for network topology updates, and/or otherwise provided to the network topology discovery engine 106. The network data 126 can be obtained by the network topology discovery engine 106 at any time. As will be explained in more detail herein, the network data 126 can be provided to or otherwise obtained by the network topology discovery engine 106 to use in creating and/or updating a network topology model 128.

The network topology model 128 can represent various aspects of a network. According to various embodiments of the concepts and technologies described herein, the network topology model 128 can represent the data centers 108 and/or the components thereof. In addition to identifying the components of the data centers 108 (e.g., the server clusters 110, the server hosts 112, the virtual machines 114, the blades 116, the virtualized network functions 118, the SDN controllers 120, the hypervisor 122, and/or other components), the network topology model 128 can represent locations of the various components, functionality associated with the various components, hierarchies associated with the various components, operational state information associated with the various components, capacity information associated with the various components, combinations thereof, or the like. These and other types of information can be represented by the network topology model 128, as will be explained in more detail below.

The network topology model 128 can be created by the network topology discovery engine 106. In some embodiments, the network topology model 128 can be created in two stages with various formats. The first stage can include creating a network topology model 128 based on the network topology inventory database, which can be retrieved once every preset time frame (e.g., once every one hour, once very ten minutes, once every ten seconds, etc.). The second stage can include updating the initial network topology model based on monitored data of realtime operational state change of various components, including virtualized network functions 118, server clusters 110, server hosts 112, virtual machines 114, and blades 116.

According to various embodiments of the concepts and technologies described herein, the network topology model 128 can be formatted by the network topology discovery engine 106 in unified modeling language ("UML") format. The UML format can be used by the network topology discovery engine 106 to enable the network topology model 128 to reflect not only components and/or hierarchies of the data centers 108 in an object-based format, but also to provide, via various types of relationships and/or attributes that can be represented by UML (e.g., composition relationships, aggregation relationships, inheritance relationships, association relationships, and the like), additional operational state information associated with the various components and their respective hierarchies and/or relationships. Thus, various types of operational state information associated with components of the data centers 108 can be defined by attributes or properties for objects in the model, as will be more clearly understood with reference to the additional description of the network topology model 128 herein.

For example, UML can be used to enable representation of, for the objects represented by the network topology model 128, properties such as operational state, capacities, locations, carrier information, power information, assigned/re-assigned information, transport information, hardware information, combinations thereof, or the like. Furthermore, because UML can provide an object-oriented representation of the network in the network topology model 128, the network topology model 128 can be used for various purposes in addition to merely representing the network.

For example, as will be explained in more detail below, various errors or events can be mapped to the network topology model 128 to perform root cause analysis and/or to initiate resolution of network errors. Furthermore, new service or existing service upgrade requests can be mapped to the network topology model 128 to identify hardware and/or software that can and/or will host the service, thereby resulting in streamlined service provisioning and/or operations based upon availability of components, capacities of the components, and the like. Because the network topology model 128 can be used for additional and/or alternative purposes, some of which will be illustrated and described in more detail below, it should be understood that these examples are illustrative and therefore should not be construed as being limiting in any way.

The network topology discovery engine 106 can analyze the network data 126 and create the network topology model 128. The network topology model 128 generated by the network topology discovery engine 106 can be stored at a data storage device such as a data store 130. The functionality of the data store 130 can be provided by one or more unitary or distributed data storage devices. Thus, the functionality of the data store 130 can include and/or be provided by one or more databases, server computers, desktop computers, mobile telephones, laptop computers, other computing systems, and the like. In the illustrated embodiments, the functionality of the data store 130 is provided by a server computer that can be configured to store and/or host data. It should be understood that this example is illustrative and therefore should not be construed as being limiting in any way.

As noted above, the network topology model 128 can be used for various purposes. In some embodiments, the network topology discovery engine 106 can also create and/or store a capacity utilization model 132. The capacity utilization model 132 can also be generated by the network topology discovery engine 106, though this is not necessarily the case. The capacity utilization model 132 can represent capacities for one, more than one, and/or each element of the data centers 108, as explained above. Thus, it can be appreciated that the capacity information reflected by the capacity utilization model 132 can be extracted from the network data 126, though this is not necessarily the case.

The capacity utilization model 132 can reflect, for one, more, and/or each element of the data center 108, a theoretical and/or actual maximum capacity, a current capacity utilization, an available utilization, combinations thereof, or the like. In some embodiments of the concepts and technologies described herein, the information reflected by the capacity utilization model 132 can be represented by one or more attributes, tags, and/or relationships within the network topology model 128. As such, the capacity utilization model 132 is optional and may not be included in some embodiments of the concepts and technologies described herein.

In some embodiments, the operating environment 100 also can include a fault correlation engine 134. The fault correlation engine 134 can be configured to use the network topology model 128 to determine faults and/or errors associated with the data centers 108, one or more components thereof, and/or other devices, systems, and/or networks. Although shown as a standalone component of the operating environment 100 in FIG. 1, it should be understood that the fault correlation engine 134 can be hosted and/or executed by the server computer system 102 in various embodiments. As such, the illustrated embodiment should not be construed as being limiting in any way.

In some embodiments, the fault correlation engine 134 can detect one or more events at one or more data center 108 and/or a component thereof. The fault correlation engine 134 can detect the events by receiving event data 136 and/or other information that can describe or represent the fault events. The events can include, for example, network outages; capacity reduction events (threshold violations, overloads, etc.); machine errors, faults, and/or failures; combinations thereof; or the like. The event data 136 can be generated by one or more component of the data centers 108 including network management devices of one or more SDN controllers 120, the resource monitor 124, combinations thereof, or the like. The event data 136 can be received or otherwise obtained by the fault correlation engine 134.

The fault correlation engine 134 can use the network topology model 128 and one or more fault correlation rules ("correlation rules") 138 to determine a cause of the events represented by the event data 136. The correlation rules 138 can define, for particular events, possible causes. For example, the correlation rules 138 may define a vSwitch failure as a possible cause of dropped packets and/or transport failures. Similarly, the correlation rules 138 may define a defective memory device as a cause of a data storage error. Thus, the correlation rules 138 can define various possible causes for various events and/or types of events. Thus, it should be understood that these examples are illustrative and therefore should not be construed as being limiting in any way.

The fault correlation engine 134 can map the fault event data 136 to the network topology model 128 using the correlation rules 138, in some embodiments. In some other embodiments, the correlation rules 138 may not be used. The fault correlation engine 134 can map the event data 136 to the network topology model 128 and identify one or more causes of the events, thereby determining a root cause for the events. The fault correlation engine 134 can output action items to an SDN controller 120, network operations, and/or other network management entities for troubleshooting, repair tickets, combinations thereof, or the like. It should be understood that this example is illustrative and therefore should not be construed as being limiting in any way.

In practice, the network topology discovery engine 106 can be executed or hosted by the server computer system 102. The network topology discovery engine 106 can be invoked at any time to create and store a network topology model 128. The network topology model 128 can describe a network and/or one or more components thereof. According to various embodiments, the network topology model 128 can be formatted in a desired modeling format. In some embodiments, an object-oriented modeling language such as UML can be used to represent the network, its components, and/or relationships and/or hierarchies between the components of the network, and various attributes, tags, properties, and/or inheritances can be used to define properties of the objects such as locations, capacities, operational states, and the like.

The network topology discovery engine 106 can receive network data 126 from the network topology inventory database in the initial stage and the topology update events from a resource monitor 124. The network data 126 can include, but is not limited to, cluster data that describes one or more server clusters 110 associated with a data center 108; host data that describes one or more server hosts 112 associated with the server cluster 110 and the data center 108; virtual machine data that describes one or more virtual machines 114 associated with the blade 116, the server host 112, the server cluster 110, the virtualized network function 118, and the data center 108; blade data that describes one or more blades 116 associated with the server host 112, the server cluster 110, and the data center 108; virtualized network function data that describes one or more virtualized network functions 118 associated with virtual machines 114, the server host 112, the server cluster 110, and the data center 108; SDNC data that describes one or more SDN controllers 120 associated with the data center 108; hypervisor data that describes one or more hypervisors 122 associated with the server host 112, the server cluster 110, and the data center 108; location data that describes geographic locations of one or more elements or components of the data center 108; capacity data that describes one or more capacities of one or more components of the data center 108; other data; combinations thereof; or the like.

The network topology discovery engine 106 can analyze the network data 126 and generate the network topology model 128 based upon the network data 126. The network topology discovery engine 106 also can store the network topology model 128 at a data storage device such as the data store 130. The network topology model discovery engine 106 also can update the network topology model 128 at any time in response to detecting a change at the network, in response to determining that a time period has passed (e.g., expiration of a timer job), and/or in response to other determinations. The timer expiration for the update can be determined by a preset time frame for retrieving the network topology data from the inventory database (e.g., every one hour, etc.). In some embodiments, the network topology model 128 can be updated by the network topology discovery engine 106 immediately upon any change being made to the network, and as such, the network topology model 128 can provide a realtime representation of the network and/or components thereof (e.g., the data centers 108 and/or components of the data centers 108).

The network topology model 128 can be used for various purposes. In some embodiments, the network topology model 128 can be used to provide a realtime representation of the operational state of the network and/or components thereof, to map new service or existing service upgrade requests to the network resource allocation based upon realtime availability and/or utilization, to determine root causes for detected events, combinations thereof, or the like. In some embodiments, a fault correlation engine 134 can be provided as a standalone device and/or as a component of the network topology discovery engine 106 and can perform the root cause analysis of events if desired.

FIG. 1 illustrates one server computer system 102, one network 104, two data centers 108, one resource monitor 124, one data store 130, and one fault correlation engine 134. It should be understood, however, that various implementations of the operating environment 100 can include zero, one, or more than one server computer system 102; zero, one, or more than one network 104; zero, one, two, or more than two data centers 108; zero, one, or more than one resource monitor 124; zero, one, or more than one data store 130; and/or zero, one, or more than one fault correlation engine 134. As such, the illustrated embodiment should be understood as being illustrative, and should not be construed as being limiting in any way.

Figure 2:
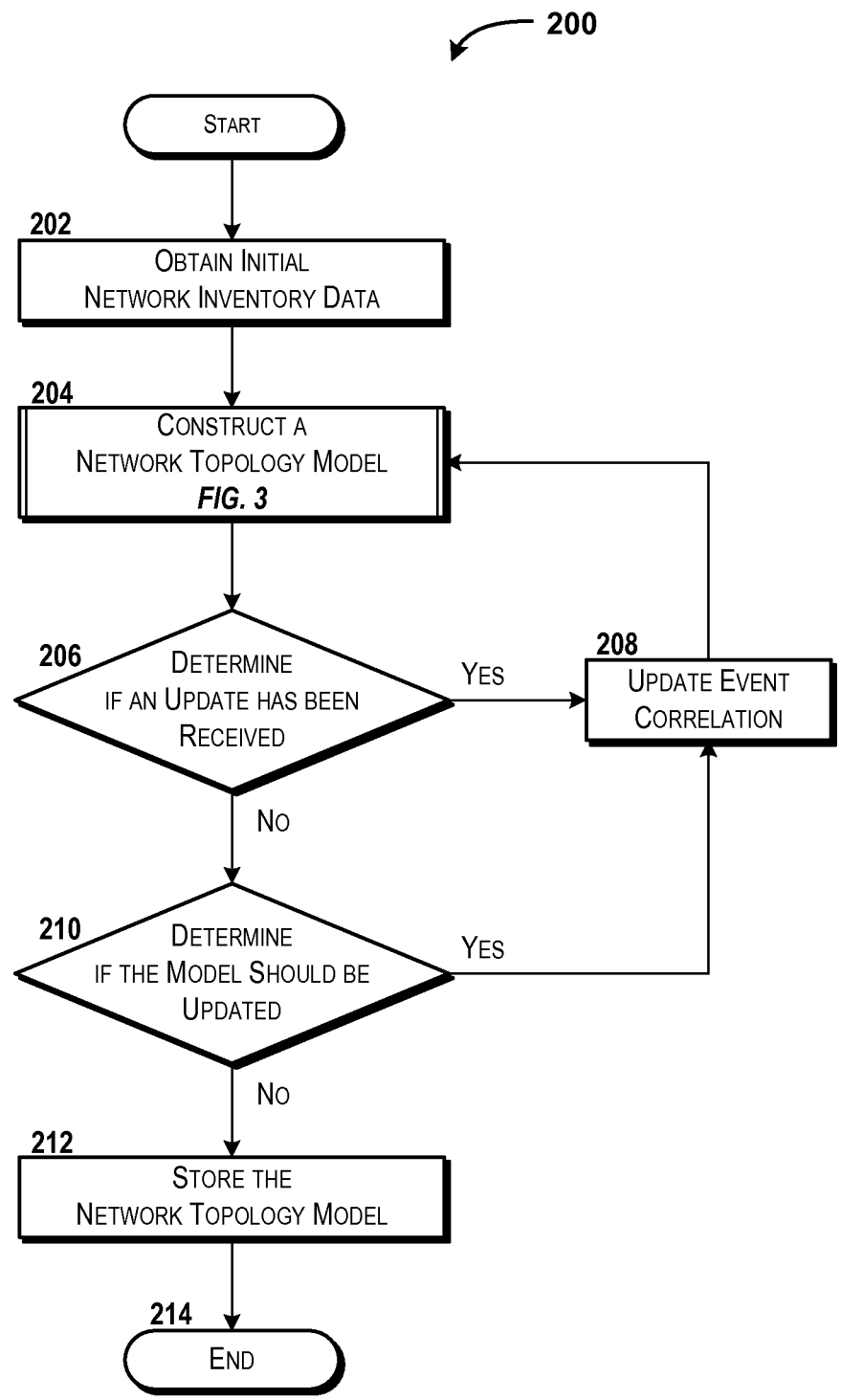
FIG. 2 is a flow diagram showing aspects of a method for creating, storing, and updating a network topology model, according to an illustrative embodiment of the concepts and technologies described herein.

Turning now to FIG. 2, aspects of a method 200 for creating, storing, and updating a network topology model 128 will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the server computer system 102 to perform one or more operations and/or causing the processor to direct other components of the computing system or device to perform one or more of the operations.

For purposes of illustrating and describing the concepts of the present disclosure, the methods disclosed herein are described as being performed by the server computer system 102 via execution of one or more software modules such as, for example, the network topology discovery engine 106. It should be understood that additional and/or alternative devices and/or network nodes can provide the functionality described herein via execution of one or more modules, applications, and/or other software including, but not limited to, the network topology model discovery engine 106. Thus, the illustrated embodiments are illustrative, and should not be viewed as being limiting in any way.

The method 200 in FIG. 2 can begin at operation 202. At operation 202, the computer system 102 can retrieve an initial set of network data 126. According to various embodiments, the computer system 102 can retrieve the initial set of network data 126 from the network topology inventory database. This retrieval can occur once every preset time frame (e.g., retrieve inventory topology data every few hours, every one hour, every minute, etc.).

From operation 202, the method 200 can proceed to operation 204. At operation 204, the server computer system 102 can construct a network topology model 128. Details of generating the network topology model 128 will be illustrated and described in more detail below with reference to FIG. 3. Briefly, for each selected virtualized network function 118, the server computer system 102 can, for each of one or more server clusters 110, identify various components of the server clusters 110 such as one or more server hosts 112, one or more virtual machines 114, and/or one or more blades 116. The server computer system 102 also can identify one or more virtualized network functions 118, one or more SDN controllers 120, one or more hypervisors 122, and/or other components such as network interfaces, ports, power resources, virtual switches ("vSwitches"), combinations thereof, or the like.

The server computer system 102 also can determine, for each of the identified components of the server cluster 110, a status of the component, a location of the component, and/or capacity of the component. This can be repeated for each server clusters 110 in a data center 108. Based upon all of these data, the server computer system 102 can create objects for each of these elements (server clusters 110, server hosts 112, virtual machines 114, blades 116, virtualized network functions 118, SDN controllers 120, hypervisors 122, and the like) and define attributes, properties, and/or other representations of hierarchies, relationships, capacities, locations, and/or operational state oriented properties of these elements.

In particular, the server computer system 102 can represent relationships between each of these elements and various types of operational state information. This information can be captured as part of a data model for the topology update that includes objects for each of the elements. In some embodiments, the data model can be captured in a desired format. In some embodiments, for example, the data model can be created as UML model. Various example embodiments of UML models are illustrated and described below with reference to FIGS. 4A-4D. Because other types of models can be generated according to various embodiments of the concepts and technologies described herein, it should be understood that this example is illustrative and therefore should not be construed as being limiting in any way.

From operation 204, the method 200 can proceed to operation 206. At operation 206, the server computer system 102 can determine if an update of operational state change in various network components in a server host 112 has been received. According to various embodiments, the network data 126 can be provided to the server computer system 102 at various times and any changes in the network data 126 can be determined by the server computer system 102 to correspond to an update. Thus, in operation 206 the server computer system 102 can effectively determine if any changes of network configuration have been made to elements of the data center 108.

As noted above, the network data 126 can be received at various times. For example, in some embodiments the network data 126 can be obtained by the server computer system 102 from a network topology inventory database initially when a timer job starts (e.g., at time t). In some other embodiments, the network data 126 can be provided to the server computer system 102 when a change of operational states to the data centers 108 and/or one or more components thereof (e.g., server clusters 110, server hosts 112, virtual machines 114, blades 116, virtualized network functions 118, etc.) occurs or is detected. Because an update of network configuration can occur at any time and/or can be detected in numerous ways by the server computer system 102, the update can be detected at almost any time. Also, the reporting mechanisms associated with the data centers 108 (e.g., the resource monitor 124) can be configured to report changes almost instantly, thereby enabling realtime (or near-realtime) updates to the network data 126. It should be understood that these examples are illustrative and therefore should not be construed as being limiting in any way.

If the server computer system 102 determines, in operation 206, that an update has been received, the method 200 can proceed to operation 208. At operation 208, the server computer system 102 can correlate operational state change events from various components in the server hosts 112 that form an operational association between virtualized network functions 118, virtual machines 114 and blades 116 in the server host 112 based on their operation states detected.

After performing event correlation in operation 208, the method 200 can return to operation 204, and the server computer system 102 can again construct the network topology model 128 or make changes to the network topology model 128. Thus, it should be appreciated that in one or more iterations of operation 204, the server computer system 102 can update a network topology model 128 or construct the network topology model 128. Because the server computer system 102 can repeat operation 204 any time an update is received, it can be appreciated that the server computer system 102 can update the network topology model 128 at almost any time (and in realtime or near realtime), thereby resulting in a constantly updated network topology model 128 that can be used as illustrated and described herein for various purposes.

If the server computer system 102 determines, in any iteration of operation 206, that an update has not been received, the method 200 can proceed to operation 210. In operation 210, the server computer system 102 can determine if the network topology model 128 should be updated for any other reason (e.g., for any reason other than detecting a change to the data centers 108, receiving an update, or receiving a release of the network data 126). In various embodiments, the server computer system 102 can execute a timer job that, when expired, can indicate that a set time period has elapsed since a last update and, in response to such a determination, update the network topology model 128. In various other embodiments, the timer can be tracked and/or executed by various other entities. Regardless of what entity tracks the time since a most recent update, the server computer system 102 can determine, in operation 210, that the model should (or should not) be updated due to passage of the time period.

If the server computer system 102 determines, in operation 210, that the network topology model 128 should be updated for any reason, the method 200 can return to operations 208 and 204, and the server computer system 102 can again perform event correlation and construct (or update) the network topology model 128. If the server computer system 102 determines, in any iteration of operation 210, that an update should not be completed, the method 200 can proceed to operation 212.

Although not explicitly shown in FIG. 2, operations 206 and 210 can be replaced, in some embodiments, by a first operation that includes determining whether or not to update the network topology model 128 and a second operation that includes updating the network topology model 128 if such a determination is made. The determination can be based upon whether or not an update has been detected or if any other consideration (e.g., a timer job) indicates that such an update should be completed. These two operations can be repeated (along with storing the updated network topology model 128) until no update is needed or the method 200 ends. As such, the illustrated embodiment is illustrative and should not be construed as being limiting in any way.

In operation 212, the server computer system 102 can store the network topology model 128. As explained above with reference to FIG. 1, the server computer system 102 can store the network topology model 128 at the data store 130 or other data storage device. The network topology model 128 can be retrieved from the data storage device at any time for various purposes as illustrated and described herein. The network topology model 128 also can be exported to other entities for various purposes. Although not shown in FIG. 2, it should be understood that the network topology model 128 can also be stored after any iteration of operation 204. Thus, operations 204-210 can be performed and/or repeated to create, update, and/or store the network topology model 128.

From operation 212, the method 200 proceeds to operation 214. The method 200 can end at operation 214. Although not shown in FIG. 2, it should be understood that the operations of the method 200 also can be repeated and therefore may not end at operation 214. In some contemplated embodiments, the method 200 can return to operation 206 from operation 212 and can repeat indefinitely. It should be understood that this example is illustrative and therefore should not be construed as being limiting in any way.

Figure 3:
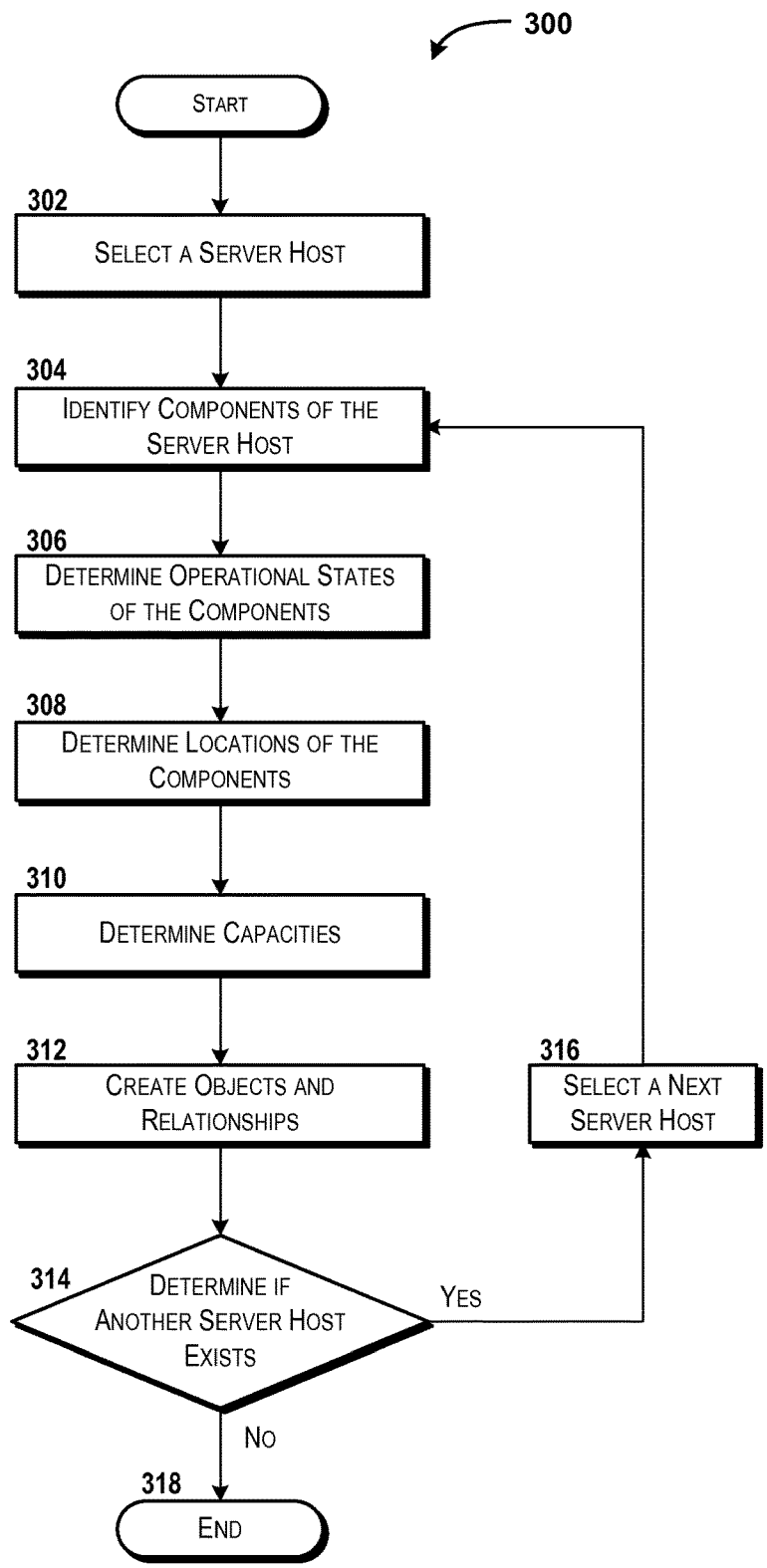
FIG. 3 is a flow diagram showing aspects of a method for constructing a network topology model, according to an illustrative embodiment of the concepts and technologies described herein.

Turning now to FIG. 3, aspects of a method 300 for constructing a network topology model 128 will be described in detail, according to an illustrative embodiment. As explained above with reference to FIG. 2, the operations illustrated in FIG. 3 can be performed by the server computer system 102 at or in association with operation 204 of the method 200. Because the operations of the method 300 can be performed at additional and/or alternative times, it should be understood that this example is illustrative and therefore should not be construed as being limiting in any way.

The method 300 begins at operation 302. At operation 302, the server computer system 102 can select a virtualized network function 118 and a server host 112 of one or more server clusters 110. Thus, for example, the server computer system 102 can receive a release of network data 126 as illustrated and described herein and determine, by analyzing the network data 126, a first server host 112 that is represented by the network data 126 (and that is to be analyzed as illustrated and described herein). The determination as to which server host 112 is to be analyzed first can be made based upon a variety of considerations.

In some embodiments, the server cluster 110 with the most available server host 112 (of the server cluster 110) supporting a selected virtualized network function can be selected by the server computer system 102 as the first server host 112 to be analyzed. In some other embodiments, the server host 112 can be selected randomly, and in still other embodiments, the server computer system 102 can select the server host 112 based upon capacity, an amount of time the server host 112 has been operational, and/or other considerations. Because the server host 112 can be selected in additional and/or alternative manners, it should be understood that this example is illustrative and therefore should not be construed as being limiting in any way.

From operation 302, the method 300 proceeds to operation 304. At operation 304, the server computer system 102 can identify one or more components of the server host 112 selected in operation 302. Thus, in operation 304, the server computer system 102 can identify one or more server hosts 112, one or more virtual machines 114, one or more blades 116, given a selected virtualized network function 118. Thus, in operation 304 the server computer system 102 can identify any components that are included in components of the server host 112 selected in operation 302.

From operation 304, the method 300 can proceed to operation 306. At operation 306, the server computer system 102 can determine one or more operational states associated with the components identified in operation 304. Thus, in operation 306, the server computer system 102 can determine an operational state for one, more, or each of the components of the server host 112 and/or components that serve elements of the server host 112. The state can include various operational states including, but not limited to, available, unavailable, assigned, unassigned, reassigned, provisioned, non-provisioned, instantiated, non-instantiated, at capacity, under capacity, combinations thereof, or the like. In some embodiments, the server computer system 102 can identify a state for each component in the server host 112 identified in operation 302 and/or each component that serves any component of the server host 112. It should be understood that this example is illustrative and therefore should not be construed as being limiting in any way.

From operation 306, the method 300 can proceed to operation 308. At operation 308, the server computer system 102 can determine one or more locations of one or more of the components identified in operation 304. Thus, in operation 308, the server computer system 102 can determine a geographic location for one, more, or each of the components of the server host 112 selected in operation 302 and/or any component of a network that serves any component of the server host 112. It should be understood that this example is illustrative and therefore should not be construed as being limiting in any way.

From operation 308, the method 300 can proceed to operation 310. At operation 310, the server computer system 102 can determine capacities associated with the components of the server host 112 selected in operation 302 and/or any element that serves one or more of those components. Thus, in operation 310 the server computer system 102 can determine a capacity (used, available, unused, etc.) for one, more, or each of the server hosts 112, virtual machines 114, blades 116, virtualized network functions 118, hypervisors 122, and/or other components associated with the server host 112 identified in operation 302. Thus, in operation 310, the server computer system 102 can determine capacities including total capacity, utilized capacity, available capacity, and the like, for each element of the server host 112 selected in operation 302 and/or any element that serves one or more of those components. It should be understood that this example is illustrative and therefore should not be construed as being limiting in any way.

From operation 310, the method 300 can proceed to operation 312. At operation 312, the server computer system 102 can create objects and relationships for a network topology model 128. Thus, in operation 312, the server computer system 102 can create, for one, more, and/or each of the components associated with the server host 112, an object and/or relationship. The server computer system 102 also can create attributes for each of the objects, wherein the attributes can include, for example, locations, capacities, states, and the like. These objects, relationships, and/or attributes can be defined in a modeling language such as, for example, UML. Some example embodiments of UML models will be illustrated and described with reference to FIGS. 4A-4D. It should be understood that this example is illustrative and therefore should not be construed as being limiting in any way.

From operation 312, the method 300 can proceed to operation 314. At operation 314, the server computer system 102 can determine if another server host 112 is to be analyzed. Thus, for example, the server computer system 102 can determine if a data center 108 or network has an additional server host 112 that should be analyzed in preparation of building the network topology model 128. If the server computer system 102 determines, in operation 314, that another server host 112 exists, the method 300 can proceed to operation 316.

At operation 316, the server computer system 102 can select a next server host 112. The next server host 112 can be selected in any manner. From operation 316, the method 300 can return to operation 304, and operations 304-314 can be repeated until the server computer system 102 determines, in any iteration of operation 314, that no additional server host 112 remains for analysis.

If the server computer system 102 determines, in operation 314, that there is no additional server host 112 to be analyzed, the method 300 can proceed to operation 318. The method 300 can end at operation 318.

Turning now to FIGS. 4A-4D, some example embodiments of network topology models 128 are illustrated and described, according to some example embodiments of the concepts and technologies described herein. It should be understood that the example network topology models 128 are illustrative of the concepts and technologies described herein. Furthermore, it should be understood that the network topology model 128 illustrated and described herein can include, but is not necessarily limited to, the information shown in the various example embodiments of the network topology models 128 shown in FIGS. 4A-4D.

Figure 4A:
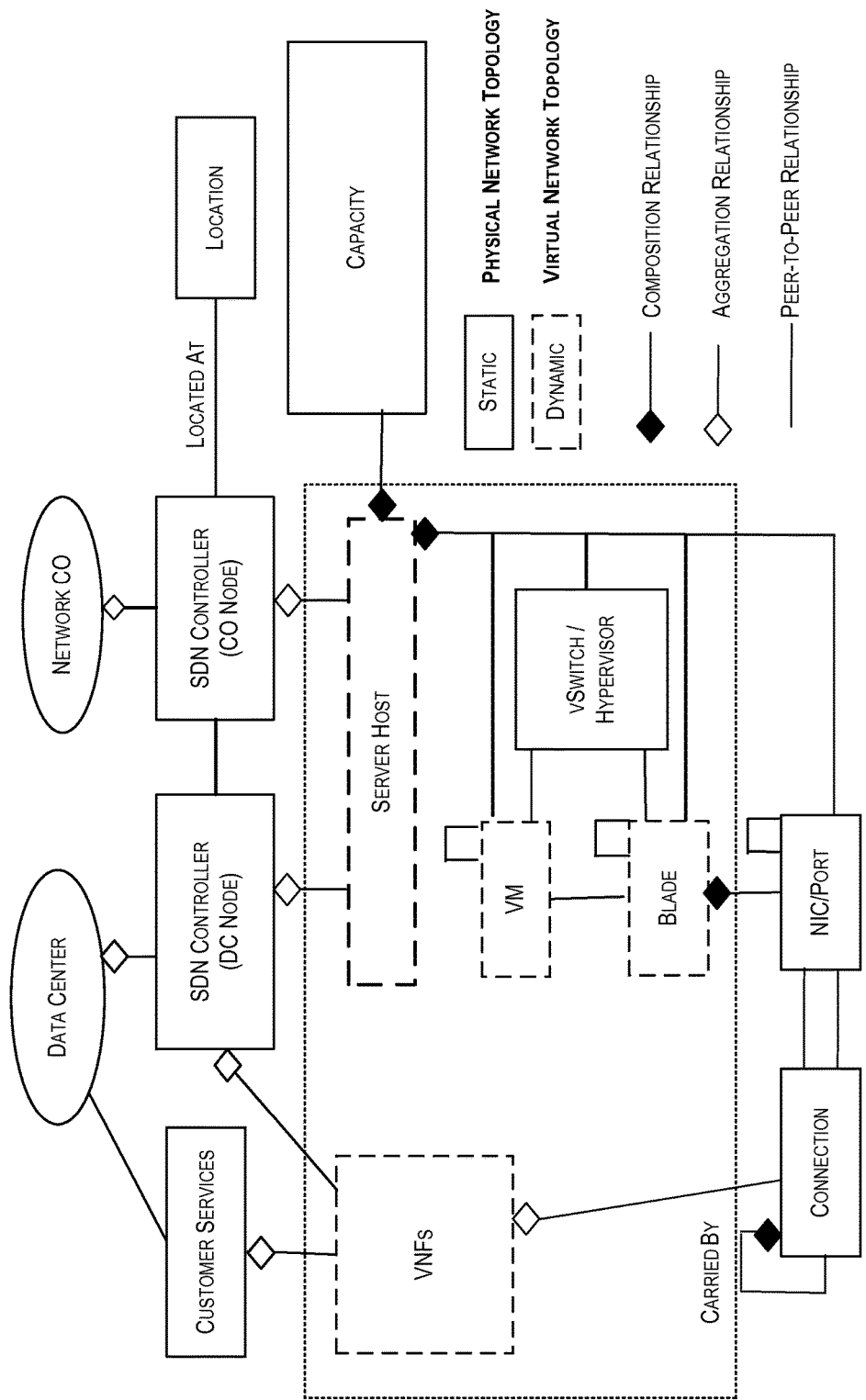
FIGS. 4A-4D are line drawings showing an example embodiment of a network topology model, according to various embodiments of the concepts and technologies described herein.

As shown in FIG. 4A, the network topology model 128 can indicate and/or represent relationships between a various components of the data center 108. Thus, for example, the network topology model 128 can indicate one or more SDN controllers 120 associated with a data center 108, as well as one or more server clusters 110, server hosts 112, virtual machines 114, blades 116, virtualized network functions 118, hypervisors 122, and/or other elements of the data center 108. Also, the network topology model 128 can indicate and/or represent network transport (virtual and/or physical) associated with the data center 108 such as vSwitches or other virtualized network functions, hardware such as network interfaces, various connections between elements in the data center 108, and the like.

The network topology model 128 also can indicate relationships between one or more hypervisors 122, network control mechanisms, physical ports, network interfaces, and the like. Also, the network topology model 128 can indicate what resources are dynamic (e.g., which resources can appear and/or disappear such as virtualized network functions, application functions, and the like), what resources are static (e.g., physical ports, network interfaces, and the like), capacities associated with one or more of the resources, locations associated with one or more of the resources, combinations thereof, or the like. It should be understood that the network topology model 128 can indicate additional and/or alternative information and as such, these examples are illustrative and should not be construed as being limiting in any way.

Figure 4B:
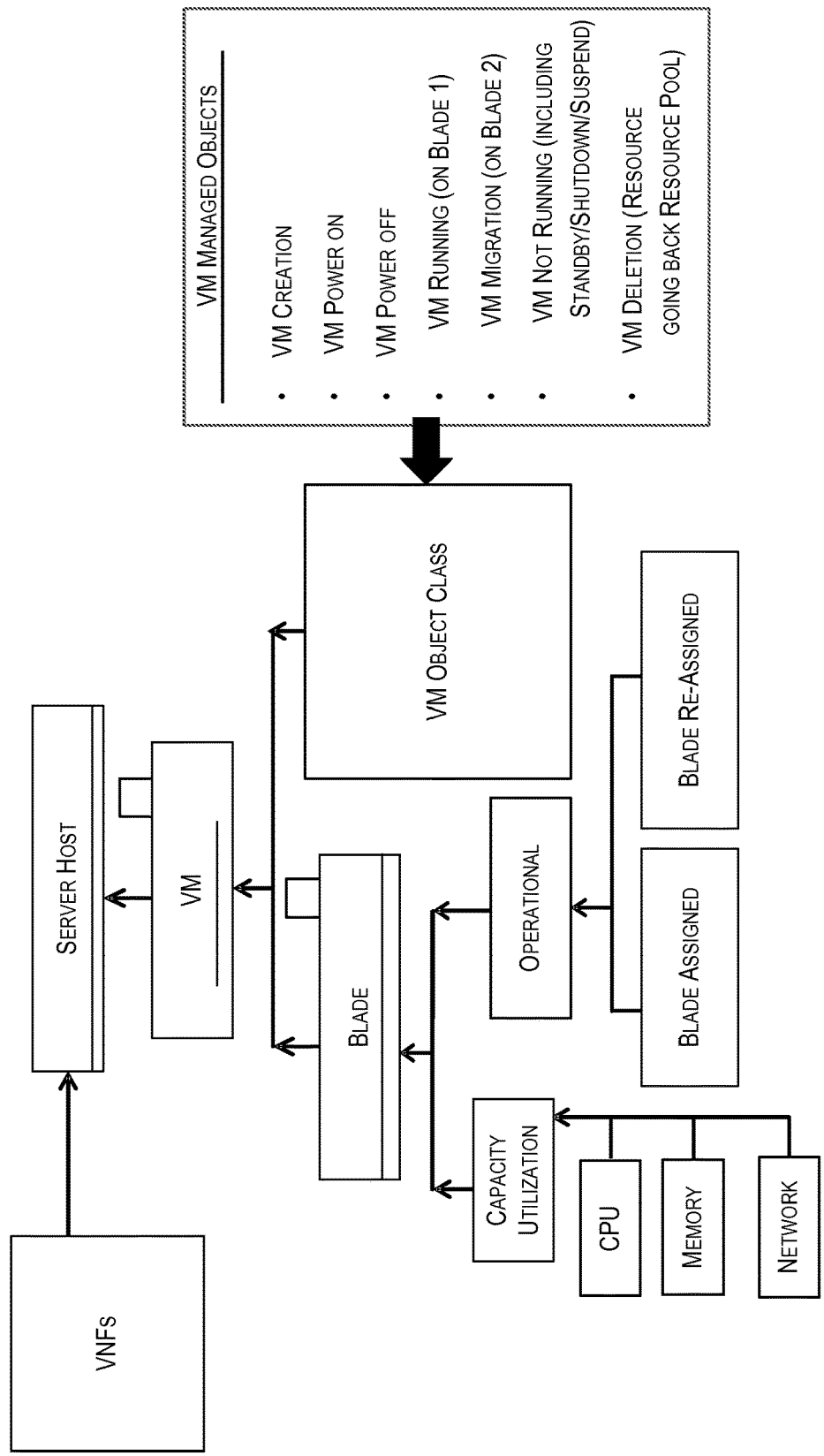

As shown in FIG. 4B, the network topology model 128 can indicate relationships between virtualized network functions 118, server hosts 112, (if differentiated), virtual machines 114, blades 116, and/or other elements of the data center 108. The network topology model 128 also can indicate, for the blades 116, a capacity utilization and an indication of whether the blade 116 is operational. The network topology model 128 also can indicate if a blade 116 is assigned or reassigned to host virtual machines that carry selected virtualized network function, in some embodiments.

The network topology model 128 also can indicate, for the blades 116, a capacity of the blade 116 including a total capacity, an available capacity, and/or a capacity utilization. Thus, the capacity of processing resources, storage resources, and/or networking resources associated with the blade 116 can be represented by the network topology model 128. For the virtual machines 114, the network topology model also can indicate a virtual machine object class that can define various attributes of the virtual machines 114 including, but not limited to, creation information, power information (on/off), whether the virtual machines 114 are migrated or migrating, whether the virtual machines 114 are running, failover information, if the virtual machine 114 is to be deleted, standby indications, combinations thereof, or the like. Because other objects classes are possible, it should be understood that these examples are illustrative and therefore should not be construed as being limiting in any way.

Figure 4C:
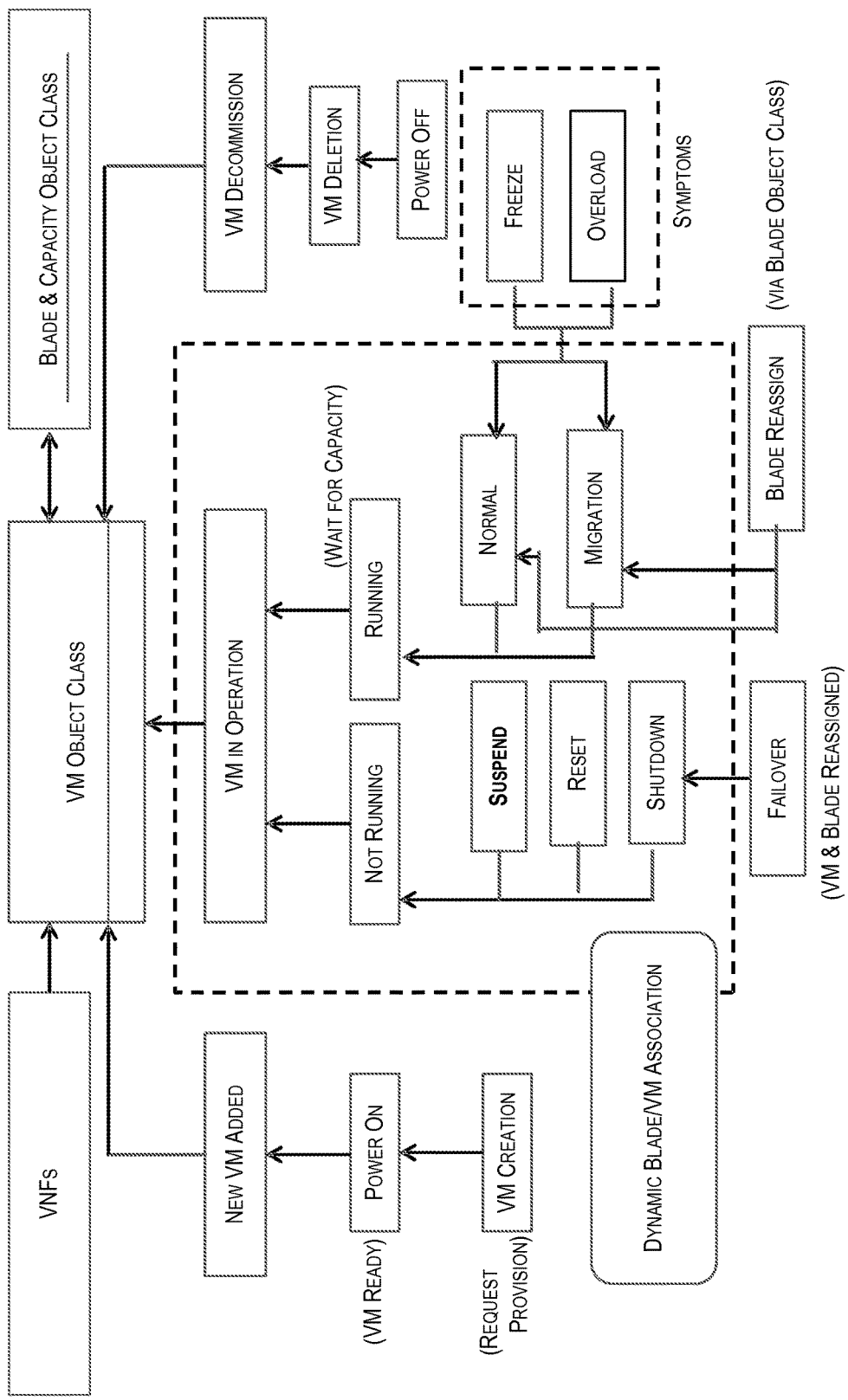

As shown in FIG. 4C, the network topology model 128 also can indicate additional information about the virtual machines 114 and/or other components of the data centers 108. The network topology model 128 can indicate, for example, if the virtual machines 114 are running or not. If not running, the network topology model 128 can indicate if the virtual machine 114 is not running due to suspension, resetting, and/or shutdown, as well as if shutdowns are due to failovers or other causes. For virtual machines 114 that are running, the network topology model 128 can indicate if the virtual machine 114 is operating normally, being migrated, being reassigned to a new blade 116, or the like. The network topology model 128 also can include representations of symptoms such as freezes and overloads, in some embodiments. Because additional and/or alternative information can be represented by the network topology model 128, it should be understood that these examples are illustrative and therefore should not be construed as being limiting in any way.

Figure 4D:
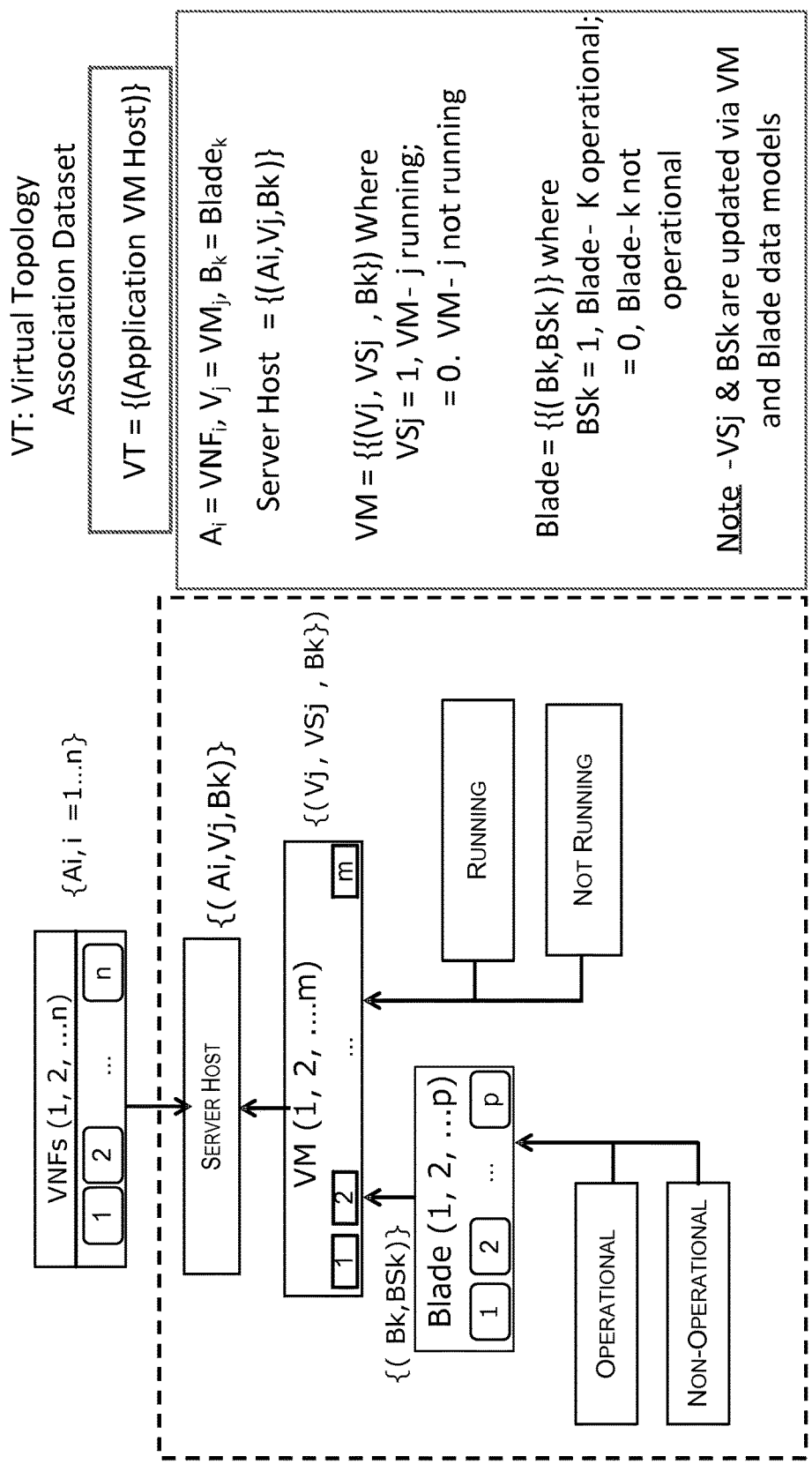

As shown in FIG. 4D, the network topology model 128 can indicate information for any number of resources of the data center 108. The information illustrated in FIG. 4D should be self-explanatory based upon the description of FIGS. 4A-4C and therefore is not further described herein for the sake of brevity. Because additional and/or alternative information can be represented by the network topology model 128, it should be understood that these examples are illustrative and therefore should not be construed as being limiting in any way.

Figure 5:
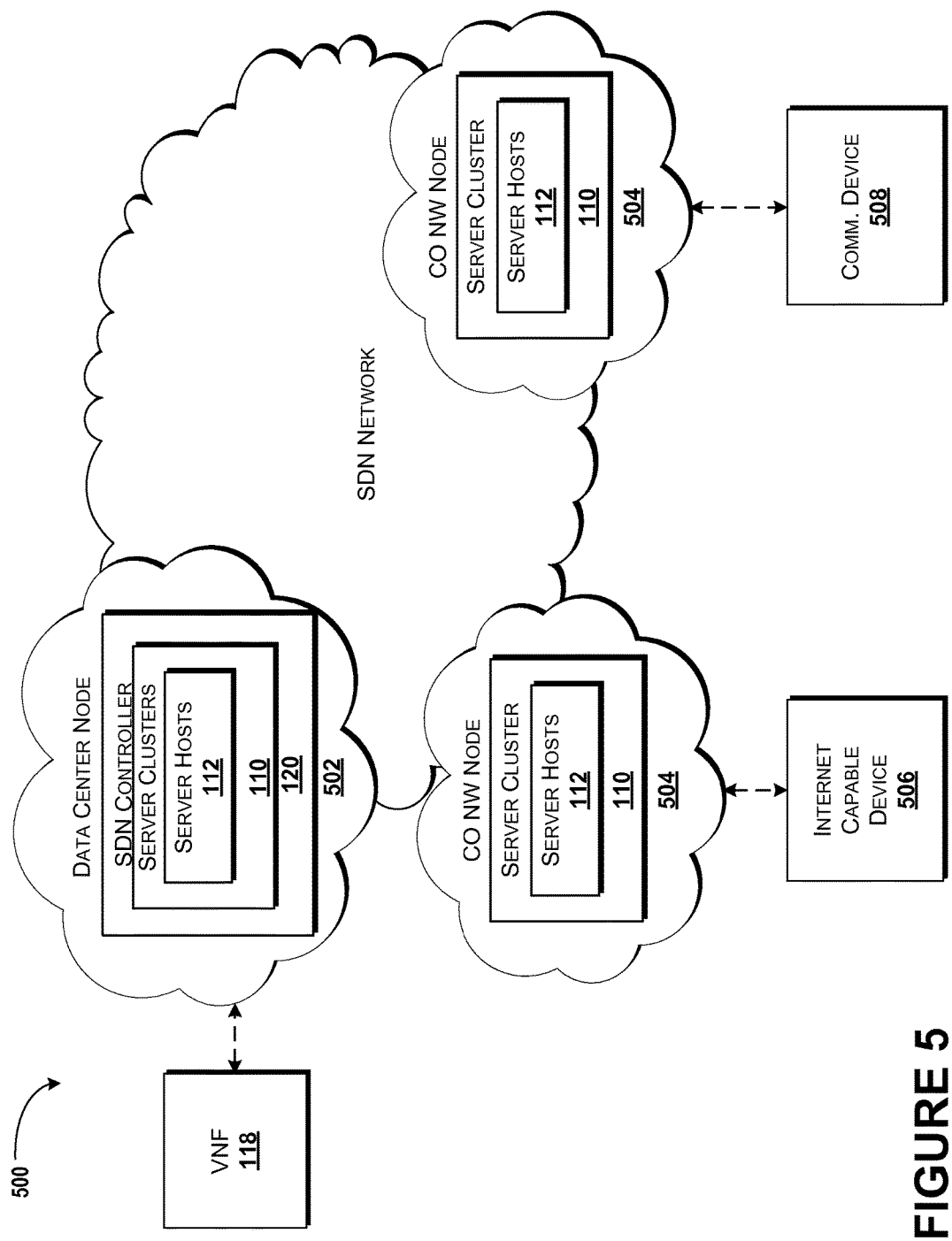
FIG. 5 schematically illustrates a network, according to an illustrative embodiment of the concepts and technologies described herein.

Turning now to FIG. 5, additional details of a network that can be used to provide the functionality of the network 104 are described in detail. In particular, FIG. 5 illustrates an example software defined networking configuration ("SDN network") 500, according to an illustrative embodiment. The illustrated SDN network 500 is configured in an example SDN configuration. As such, it should be understood that this example SDN network 500 is illustrative and therefore should not be construed as being limiting in any way.

The illustrated SDN network 500 includes a node of a data center ("data center node") 502 and one or more (FIG. 5 illustrates two) central office network nodes 504 (labeled "CO NW Node" in FIG. 5). Virtualized network functions 118 are supported through the data center node 502. The illustrated data center node 502 includes a centralized SDN controller 120, server clusters 110, and server hosts 112. The centralized SDN controller 120 can perform on-demand resource allocation tasks on the central office network nodes 504 on-demand in the control plane. The central office network nodes 504 can perform hardware reconfiguration tasks in the data plane, switching tasks in the control plane, and support virtualized network functions 118 in the control plane.

The illustrated central office network nodes 504 are shown in communication with the customer premises via one or more Internet-capable devices 506, such as a PC, a laptop, a portable device, or another suitable device, and one or more communications devices 508, such as a telephone, facsimile machine, modem, computer, or the like. It should be appreciated that the communications device 508 can be an Internet-capable device, and can be substantially similar to the Internet-capable device 506.

Figure 6:
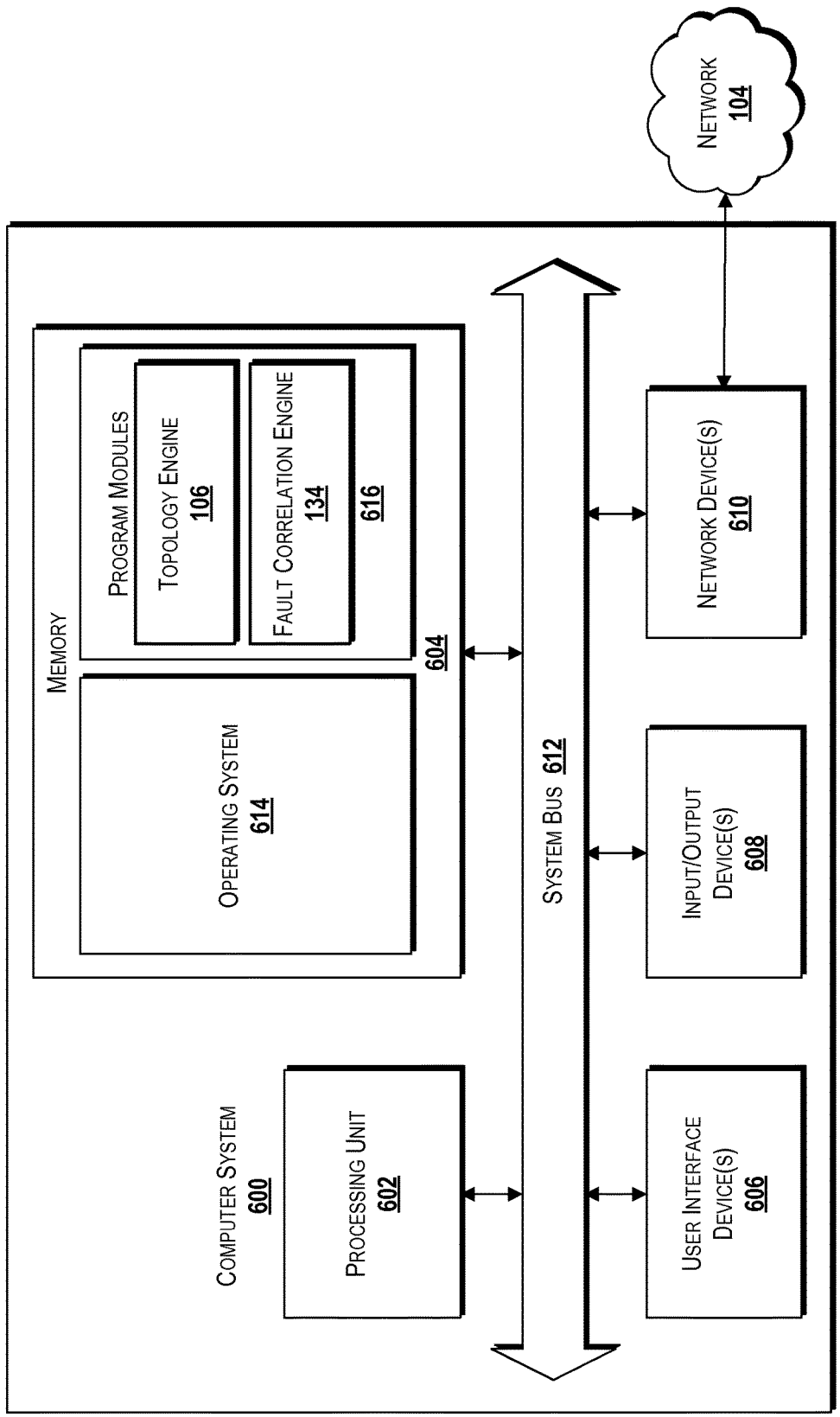
FIG. 6 is a block diagram illustrating an example computer system configured to provide the functionality of the network topology model discovery engine, according to some illustrative embodiments of the concepts and technologies described herein.

FIG. 6 is a block diagram illustrating a computer system 600 configured to provide the functionality described herein for the network topology discovery engine 106 and/or the fault correlation engine 134, in accordance with various embodiments of the concepts and technologies disclosed herein. Thus, the computer system 600 shown in FIG. 6 can correspond to the server computer system 102, though this is not necessarily the case. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 can include the network topology discovery engine 106 and/or the fault correlation engine 134. These and/or other programs can be embodied in computer-readable media containing instructions that, when executed by the processing unit 602, perform one or more of the methods 200, 300 described in detail above with respect to FIGS. 2-3. According to embodiments, the program modules 616 may be embodied in hardware, software, firmware, or any combination thereof. Although not shown in FIG. 6, it should be understood that the memory 604 also can be configured to store the network data 126, the network topology model 128, the capacity utilization model 132, event data 136 that corresponds to one or more events, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104 or the SDN network 500. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for providing a network topology discovery engine have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A method comprising:
obtaining, at a processor that executes a network topology discovery engine, network data that describes elements of a data center, the network data comprising information that describes relationships between the elements, operations state information for the elements, and capacity data that describes capacities and usage of the elements; and
constructing, by the processor and based on the network data, a network topology model, wherein constructing the network topology model comprises selecting a server host associated with the data center, identifying components associated with the server host, determining operational states of the components, correlating operational state change events of the components, determining a geographic location of the server host, determining capacities of the components, and creating an object-oriented model of the data center, wherein creating the object-oriented model comprises creating a first object that represents a first element of the elements of the data center and creating a second object that represents a second element of the elements of the data center, and wherein creating the first object comprises creating an attribute of the first object, wherein the attribute defines a relationship between the first element and the second element, and wherein the attribute defines an operational state of the first element, the operational state of the first element being one of available, unavailable, assigned, unassigned, reassigned, provisioned, non-provisioned, instantiated, or non-instantiated, and wherein constructing the network topology model further comprises constructing, in unified modeling language, the network topology model, wherein objects are added for the components, and wherein the operational states of the components, the geographic location, and the capacities of the components are represented in the network topology model by relationships in the unified modeling language.

2. The method of claim 1, further comprising:
determining that an update to the network data has been received via realtime monitoring of an operation state change associated with one of the elements of the data center; and correlating operation state change events of virtualized network components in server hosts to update the network topology model.

3. The method of claim 1, further comprising:
receiving a new service request;
mapping the new service request to the elements of the data center using the network topology model; and
allocating the elements of the data center based on the new service request.

4. The method of claim 1, further comprising:
receiving an existing service upgrade request;
mapping the existing service upgrade request to the elements of the data center using the network topology model; and
allocating the elements of the data center based on the existing service upgrade request.

5. The method of claim 1, further comprising:
detecting a fault event at the data center;
determining a cause of the fault event using the network topology model; and
outputting, to a software defined networking controller, an action item relating to repair of the cause of the fault event.

6. The method of claim 1, wherein the attribute is represented in the network topology model as an aggregation relationship.

7. The method of claim 1, wherein the attribute further comprises information that identifies a geographic location of the first element, and wherein the second object inherits the geographic location from the first object via the attribute.

8. The method of claim 1, wherein the components comprise virtualized network functions, a virtual machine, a blade, and an operational association between the virtualized network functions, the virtual machine, and the blade.

9. A system comprising:
a processor; and
a memory that stores computer-executable instructions that, when executed by the processor, cause the processor to perform operations comprising
obtaining network data that describes elements of a data center, wherein the network data comprises information that describes relationships between the elements, operations state information for the elements, and capacity data that describes capacities and usage of the elements, and
constructing a network topology model based on the network data, wherein constructing the network topology model comprises selecting a server host associated with the data center, identifying components associated with the server host, determining operational states of the components, correlating operational state change events of the components, determining a geographic location of the server host, determining capacities of the components, and creating an object-oriented model of the data center, wherein creating the object-oriented model comprises creating a first object that represents to a first element of the elements of the data center and creating a second object that represents to a second element of the elements of the data center, and wherein creating the first object comprises creating an attribute of the first object, wherein the attribute defines a relationship between the first element and the second element, and wherein the attribute defines an operational state of the first element, the operational state of the first element being one of available, unavailable, assigned, unassigned, reassigned, provisioned, non-provisioned, instantiated, or non-instantiated, and wherein constructing the network topology model further comprises constructing, in unified modeling language, the network topology model, wherein objects are added for the components, and wherein the operational states of the components, the geographic location, and the capacities of the components are represented in the network topology model by relationships in the unified modeling language.

10. The system of claim 9, wherein the attribute is represented in the network topology model as an aggregation relationship.

11. The system of claim 9, wherein the components comprise virtualized network functions, a virtual machine, a blade, and an operational association between the virtualized network functions, the virtual machine, and the blade.

12. The system of claim 9, wherein the computer-executable instructions, when executed by the processor, cause the processor to perform operations further comprising:
detecting a fault event at the data center;
determining a cause of the fault event using the network topology model; and
outputting, to a software defined networking controller, an action item relating to repair of the cause of the fault event.

13. The system of claim 9, wherein the computer-executable instructions, when executed by the processor, cause the processor to perform operations further comprising:
receiving a request comprising a new service request or an existing service upgrade request;
mapping the request to the elements of the data center using the network topology model; and
allocating the elements of the data center based on the request.

14. The system of claim 9, wherein the attribute further comprises information that identifies a geographic location of the first element, and wherein the second object inherits the geographic location from the first object via the attribute.

15. A computer storage medium having computer-executable instructions stored thereon that, when executed by a processor, cause the processor to perform operations comprising:
obtaining network data that describes elements of a data center, wherein the network data comprises information that describes relationships between the elements, operations state information for the elements, and capacity data that describes capacities and usage of the elements; and
constructing a network topology model based on the network data, wherein constructing the network topology model comprises selecting a server host associated with the data center, identifying components associated with the server host, determining operational states of the components, correlating operational state change events of the components, determining a geographic location of the server host, determining capacities of the components, and creating an object-oriented model of the data center, wherein creating the object-oriented model comprises creating a first object that represents to a first element of the elements of the data center and creating a second object that represents to a second element of the elements of the data center, and wherein creating the first object comprises creating an attribute of the first object, wherein the attribute defines a relationship between the first element and the second element, and wherein the attribute defines to an operational state of the first element, the operational state of the first element being one of available, unavailable, assigned, unassigned, reassigned, provisioned, non-provisioned, instantiated, or non-instantiated, and wherein constructing the network topology model further comprises constructing, in unified modeling language, the network topology model, wherein objects are added for the components, and wherein the operational states of the components, the geographic location, and the capacities of the components are represented in the network topology model by relationships in the unified modeling language.

16. The computer storage medium of claim 15, wherein the attribute is represented in the network topology model as an aggregation relationship.

17. The computer storage medium of claim 15, wherein the components comprise virtualized network functions, a virtual machine, a blade, and an operational association between the virtualized network functions, the virtual machine, and the blade.

18. The computer storage medium of claim 15, wherein the computer-executable instructions, when executed by the processor, cause the processor to perform operations further comprising:

detecting a fault event at the data center;
  determining a cause of the fault event using the network topology model; and
  outputting, to a software defined networking controller, an action item relating to repair of the cause of the fault event.

19. The computer storage medium of claim 15, wherein the computer-executable instructions, when executed by the processor, cause the processor to perform operations further comprising:

receiving a request comprising a new service request or an existing service upgrade request;
  mapping the request to the elements of the data center using the network topology model; and
  allocating the elements of the data center based on the request.

20. The computer storage medium of claim 15, wherein the attribute further comprises information that identifies a geographic location of the first element, and wherein the second object inherits the geographic location from the first object via the attribute.

* * * * *